US008272025B1

(12) United States Patent
Burnham et al.

(10) Patent No.: US 8,272,025 B1
(45) Date of Patent: Sep. 18, 2012

(54) POLICY DECONFLICTION

(75) Inventors: James B. Burnham, San Ramon, CA (US); Shane C. Owens, Palo Alto, CA (US); Thomas J. Gianos, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 162 days.

(21) Appl. No.: 12/002,683

(22) Filed: Dec. 18, 2007

(51) Int. Cl.
H04L 29/06 (2006.01)

(52) U.S. Cl. .......... 726/1; 726/2; 726/26; 707/747; 707/791; 707/798

(58) Field of Classification Search .......... 726/1, 2, 726/26; 707/747, 791, 798
See application file for complete search history.

(56) References Cited

U.S. PATENT DOCUMENTS

| | | | | |
|---|---|---|---|---|
| 7,779,394 | B2* | 8/2010 | Homing et al. | 717/136 |
| 7,895,666 | B1* | 2/2011 | Eshghi et al. | 726/30 |
| 8,032,557 | B1* | 10/2011 | Vijendra et al. | 707/783 |
| 2005/0063545 | A1* | 3/2005 | Fujimoto et al. | 380/277 |
| 2005/0091518 | A1* | 4/2005 | Agarwal et al. | 713/193 |
| 2007/0107046 | A1* | 5/2007 | Jaeger et al. | 726/4 |
| 2007/0162966 | A1* | 7/2007 | Agrawal et al. | 726/6 |
| 2007/0276843 | A1* | 11/2007 | Lillibridge et al. | 707/100 |
| 2008/0075007 | A1* | 3/2008 | Mehta et al. | 370/238 |
| 2008/0104665 | A1* | 5/2008 | Naldurg et al. | 726/2 |
| 2008/0201760 | A1* | 8/2008 | Centonze et al. | 726/1 |
| 2008/0208917 | A1* | 8/2008 | Smoot et al. | 707/200 |
| 2008/0271022 | A1* | 10/2008 | Strassner et al. | 718/100 |
| 2010/0011027 | A1* | 1/2010 | Cox et al. | 707/200 |
| 2010/0235879 | A1* | 9/2010 | Burnside et al. | 726/1 |
| 2010/0241603 | A1* | 9/2010 | Voskuil et al. | 706/47 |
| 2011/0113036 | A1* | 5/2011 | Idicula et al. | 707/747 |
| 2011/0131185 | A1* | 6/2011 | Kirshenbaum | 707/654 |

* cited by examiner

*Primary Examiner* — Nathan Flynn
*Assistant Examiner* — Sarah Su
(74) *Attorney, Agent, or Firm* — Oliff & Berridge, PLC

(57) ABSTRACT

Disclosed are exemplary policy deconfliction methods and software for identifying conflicts in policy. The policy deconfliction methods and software may be embodied as an implementation of a subset of RuleML (informal/semi-formal) and Attribute Based Semantic Lattice (formal). The policy deconfliction methods and software act on a semantic representation of policy compiled from specific rule languages (e.g. XACML, RuleML). To detect and correct conflicts, the policy deconfliction methods and software perform a path analysis over the semantic representation of the policy to distinguish between equivalent, new, and overlapping policy (potential conflicts), regardless of policy language.

18 Claims, 8 Drawing Sheets

POLICY DECONFLICTION

BACKGROUND

The present invention relates generally to policy deconfliction.

Policy is a function that takes many forms, from guidance to executable instructions. Policy is becoming increasingly important as a horizontal function that crosses system boundaries. Policy is authored by many authorities in many forms of representation. These policies may be related hierarchically or by multi-party agreements. System functions must perform in a manner consistent with the complete set of policies applicable to a specific function within a given environment. An automated system of identifying conflicts (anything that would result in a non-deterministic decision process) in a policy set is required to insure that policy is executed as defined. The present invention addresses this.

More particularly, policy today is primarily authored within organizations according to hierarchical directives. Policy is enforced by independent, system-specific (stovepipe) implementations. Policy is static, in that changes go through processes that result in manually coordinated system maintenance or "manual overrides."

Current policy implementations are system-specific, not an external horizontal (cross-system) function. Deconfliction today is limited to "compiler" (e.g., invalid attribute name), system-specific functions (e.g., make sure total allocation$\leq$100%), or theoretical approaches such as theorem provers.

Theorem provers may be used to solve the problem of identifying simple conflicts associated with specific languages, but have not been practical due to complexity and computational limitations when targeted at cross-system policy solutions.

Therefore, it would be desirable to have a policy deconfliction method and software that insures that a policy is "executable."

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
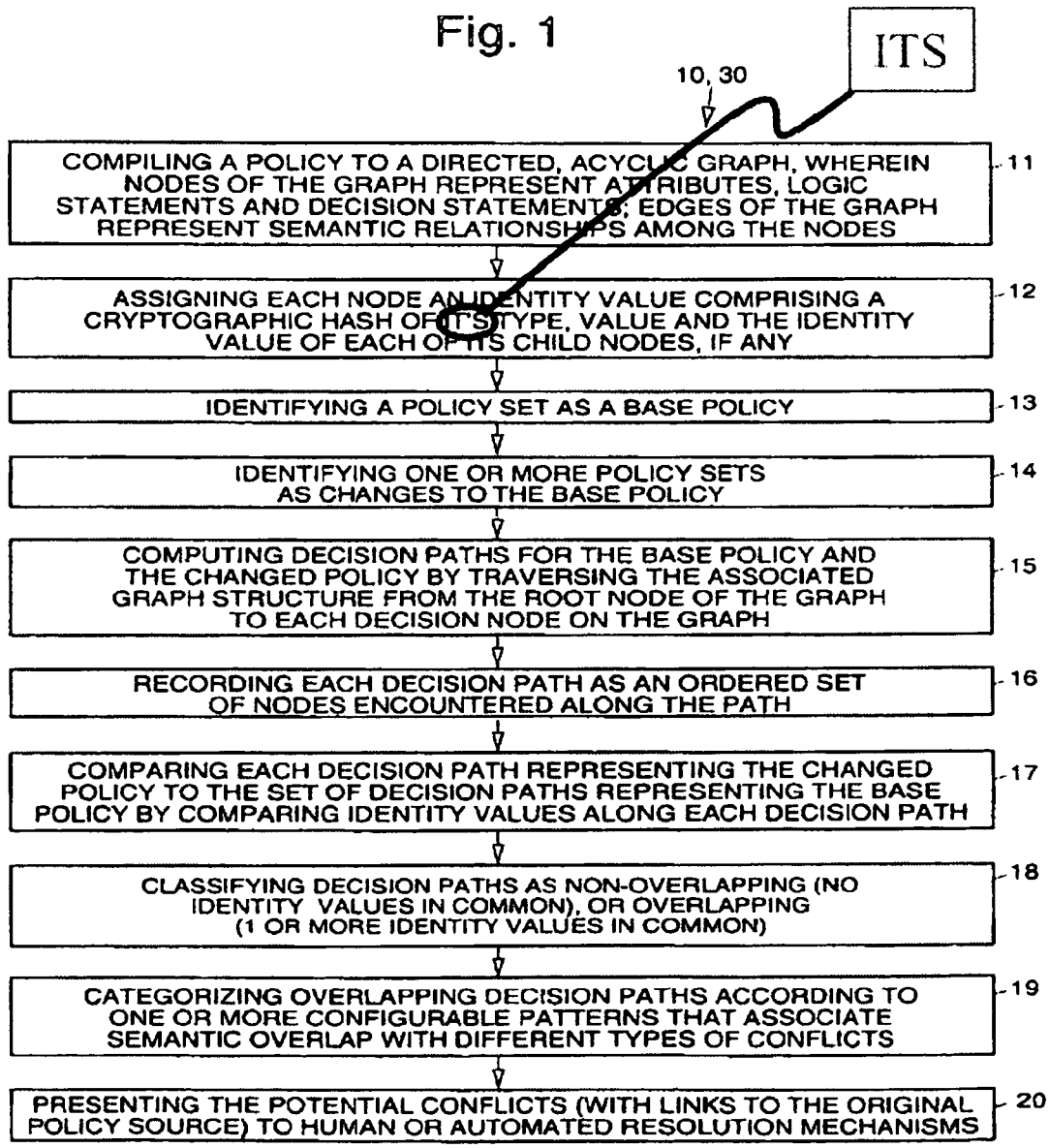
FIG. 1 is a flow diagram illustrating an exemplary method and software for implementing policy deconfliction.

Referring to the drawing figures, disclosed herein are exemplary policy deconfliction methods 10 and software 30 for identifying policy conflicts. FIG. 1 is a flow diagram illustrating an exemplary method 10 and software 30 for implementing policy deconfliction. The exemplary software 30 comprises code segments that implement the actions described below with reference to the exemplary method 10.

As is shown in FIG. 1, a policy is compiled 11 to a directed, acyclic graph. Nodes of the graph represent attributes, logic statements (e.g., conditionals, conjunctives, disjunctives, etc.), decision statements (e.g. "grant access"). Edges of the graph represent semantic relationships among the nodes. Each node is assigned 12 an identity value comprising a cryptographic hash of it's type and value (e.g., type is "role" and value is "officer") and the identity value of each of its child nodes, if any.

A policy set (set of decision paths) is identified 13 as a "base" policy, and one or more policy sets (one or more sets of decision paths) are identified 14 as "changes" to the base policy. Decision paths for the base policy and the changed policy are computed 15 by traversing the associated graph structures from the root node of the graph to each node on the graph forming a decision (e.g., "grant access"). Each decision path is recorded 16 as an ordered set of identity values encountered along the path. The set of decision paths representing the base policy is compared 17 to the set of decision paths representing the changed policy by comparing identity values in each decision path. Decision paths are classified 18 as non-overlapping ("new" policy) or overlapping (potentially conflicting policy).

Overlapping decision paths are categorized 19 according to one or more configurable patterns that associate semantic overlap with different types of conflicts. The potential conflicts are then presented 20 (with links to the original policy source) to human or automated resolution mechanisms.

The disclosed methods 10 and software 30 are computationally feasible for complex policy and are not language-specific. The disclosed methods 10 and software 30 implement techniques for solving a problem that has not been solved heretofore.

The policy deconfliction methods 10 and software 30 act on a semantic representation of policy compiled from specific rule languages (e.g. XACML, RuleML). In order to detect and correct conflicts, the policy deconfliction methods 10 and software 30 perform a path analysis over the semantic representation of the policy to distinguish between equivalent, new, and overlapping policy (potential conflicts), regardless of policy language.

Figure 2:
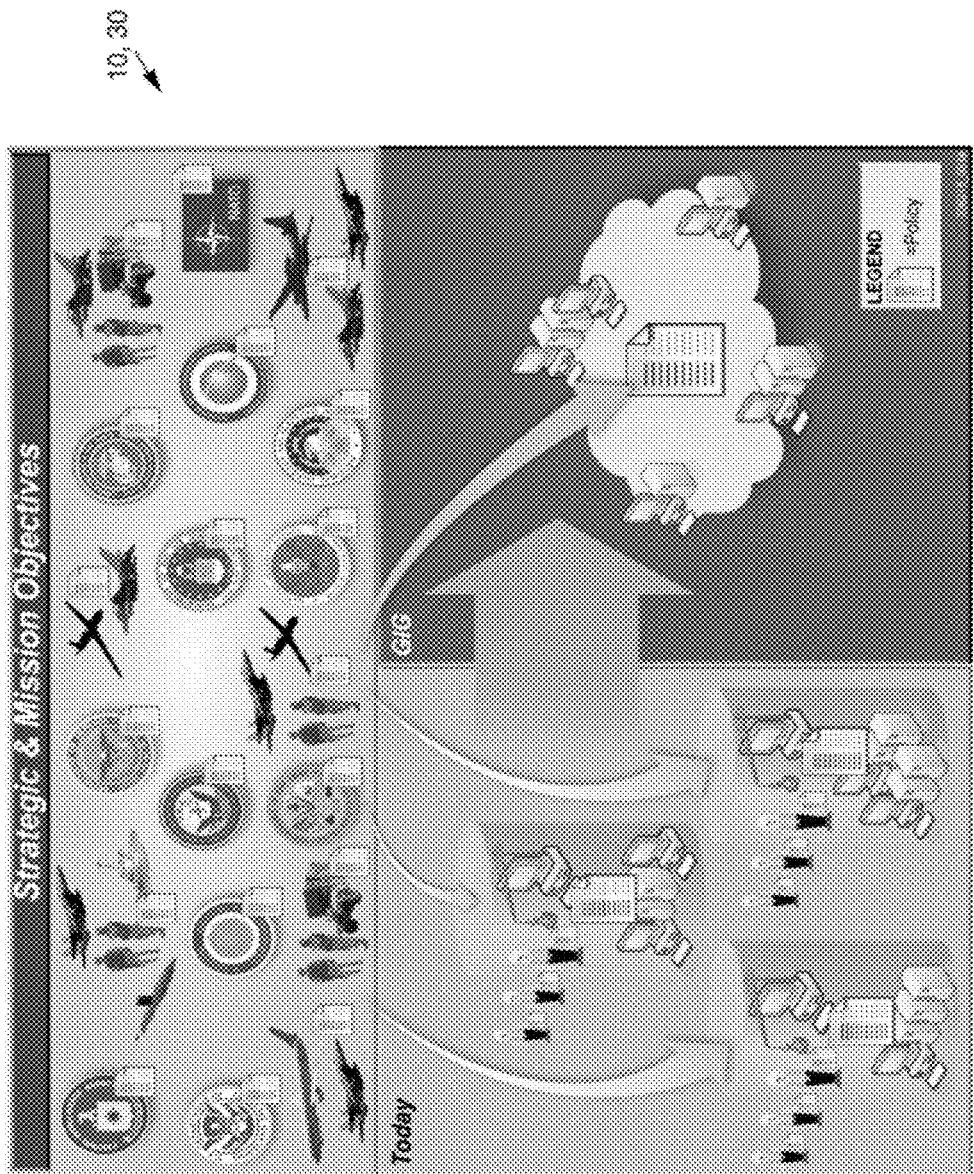
FIG. 2 illustrates exemplary policy implementations as done currently, and as is envisioned by the Global Information Grid.

FIG. 2 illustrates a pictorial view of exemplary policy implementations as done currently, and as is envisioned by the Global Information Grid. Various military organizations represented at the top of FIG. 2 issue individual policies. As is illustrated at the lower left of FIG. 2, the conventional approach is to implement the respective policies on an organization-by-organization basis in respective computer systems. The approach for the Global Information Grid shown at the lower right of FIG. 2, involves integrating all of the respective individual policies into one common policy in a computer system that is globally available to all organizations.

The policy is compiled to a semantic representation. Detection and correction of conflicts may be achieved using a path analysis over the semantic representation. This allows distinguishing between equivalent, new, and overlapping policy (potential conflicts); regardless of policy language. Conventional policy products have significant limitations in relation to GIG needs (e.g., XACML implementations) or have been limited to research status (theorem provers). The disclosed methods provide for an algorithmic solution that supports practical policy conflict identification.

Figure 3:
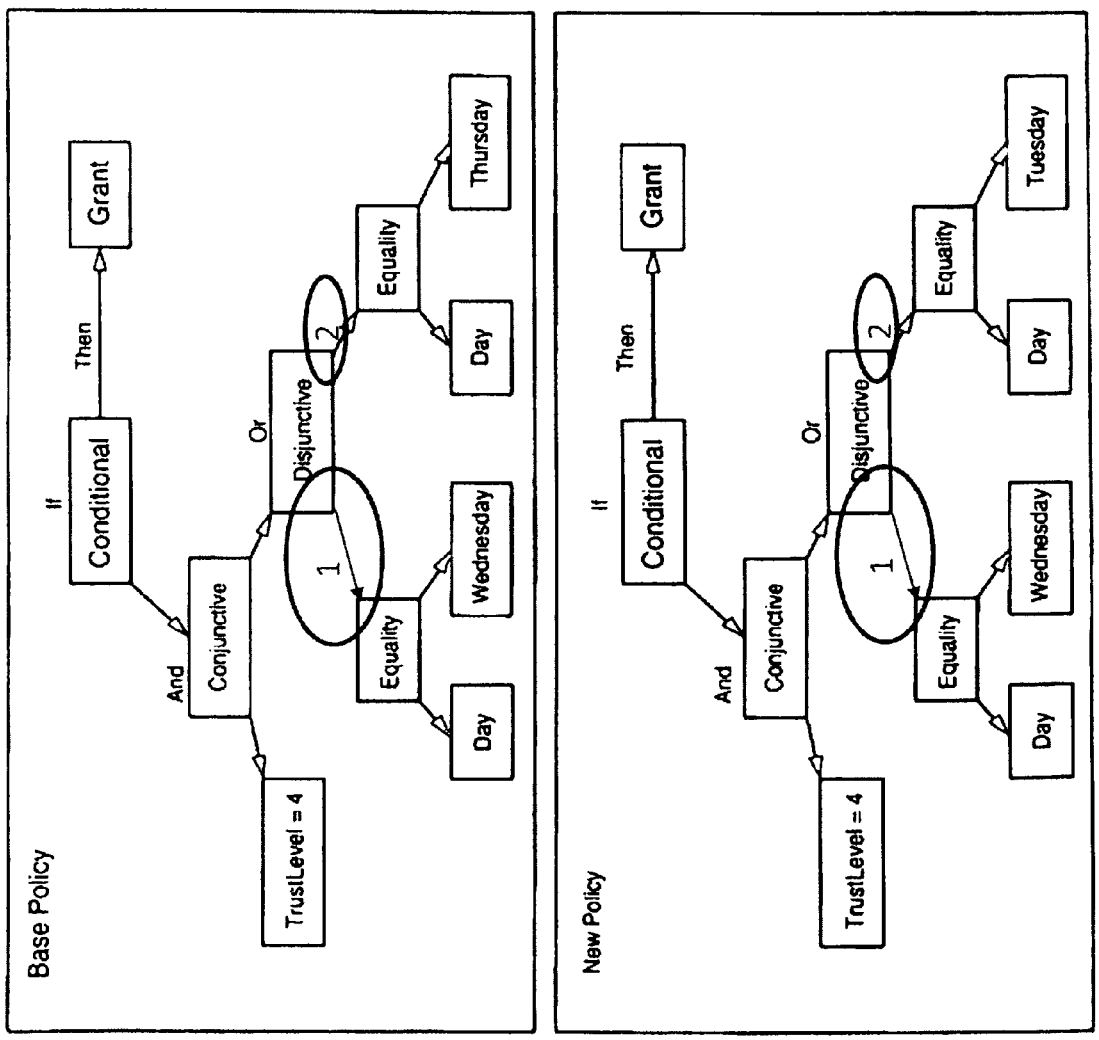
FIG. 3 illustrates an exemplary policy implementations scenario for deconflicting two statements: day=(Wednesday, Thursday) and day=(Wednesday, Tuesday)

FIG. 3 illustrates an exemplary policy implementation scenario for deconflicting two statements: day=(Wednesday, Thursday) and day=(Wednesday, Tuesday). The upper portion of FIG. 3 shows a base policy while the lower portion of FIG. 3 shows a new or changed policy. There are two base decision paths (base decision path 1 and base decision path 2) shown with regard to the base policy. Base decision path 1 has the day being Wednesday while the base decision path 2 has the day being Thursday. There are two new policy decision paths (new policy decision path 1 and new policy decision path 2) shown with regard to the base policy. New policy decision path 1 has the day being Wednesday while the new policy decision path 2 has the day being Tuesday.

Figure 4:
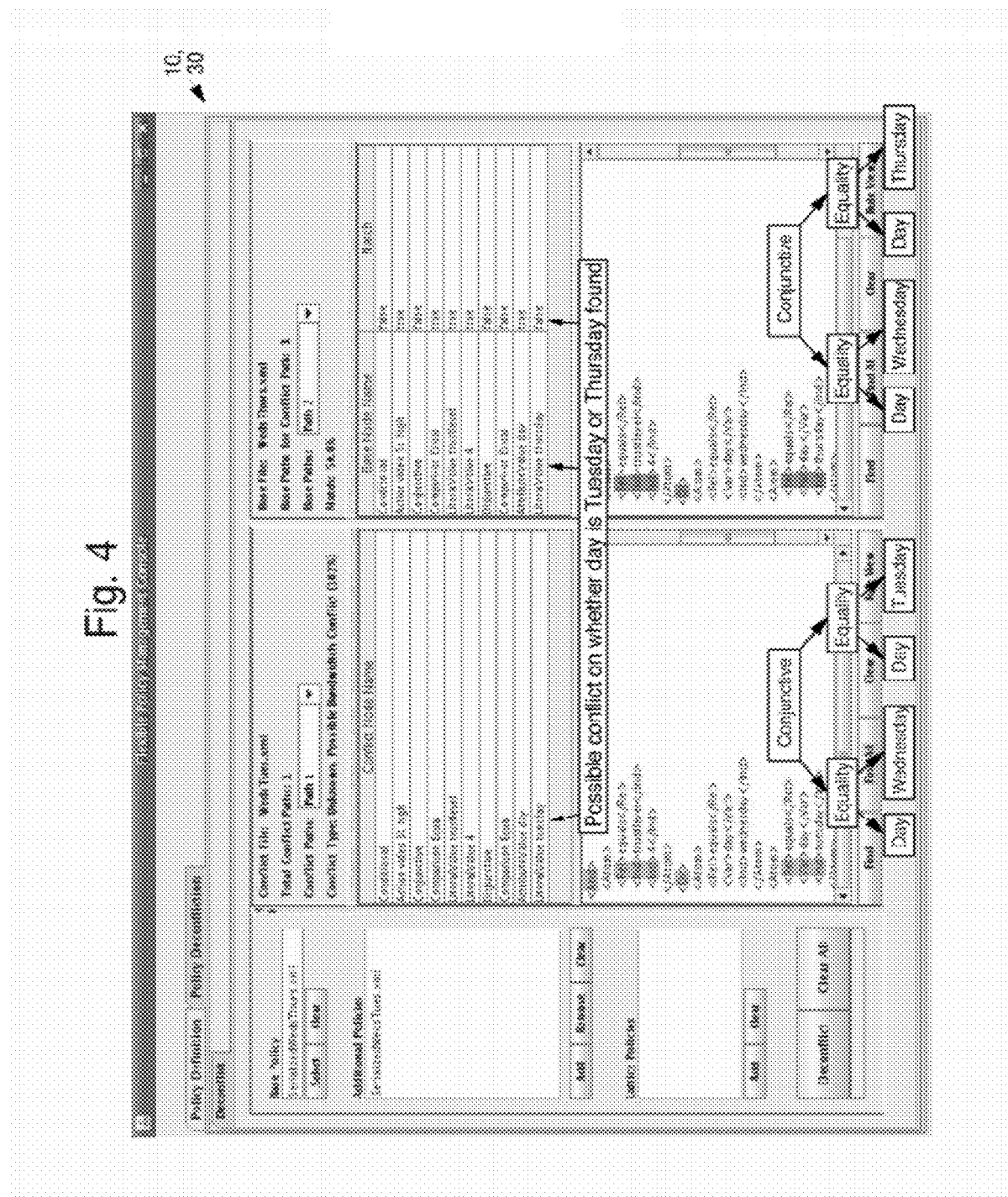
FIG. 4 illustrates an exemplary policy implementations scenario wherein the two statements of FIG. 3: day=(Wednesday, Thursday) and day=(Wednesday, Tuesday) are generated and deconfliction is performed.

FIG. 4 illustrates the identification of policy conflicts resulting from the scenario in FIG. 3: two conflicting statements: day=(Wednesday, Thursday) and day=(Wednesday, Tuesday) are shown as being in conflict (policy on Tuesday and Thursday is indeterminate). The selection frame shown in FIG. 4 presents the selected base policy followed by the selected additional "change" policies.

The conflict frame shown in FIG. 4 shows all relevant information about the "conflict paths". Those paths are decision paths within the additional policies that were found in some way different than those in the base policy. The total number of conflict paths is displayed and a path can be selected for display from a drop down box. Once a conflict path is selected it's conflict type is displayed as well as the nodes of the path.

The base policy frame shown in FIG. 4 contains all the information about the base paths relative to each conflict path. When a conflict path is selected you gain the ability to select one of the base paths from a drop down menu and display its information including the percent of node matches, a list of nodes in the path and whether each node was matched or not. The conflict results can be associated directly with the original source policy (with the Find or Find All functions as shown on FIG. 4).

Figure 5:
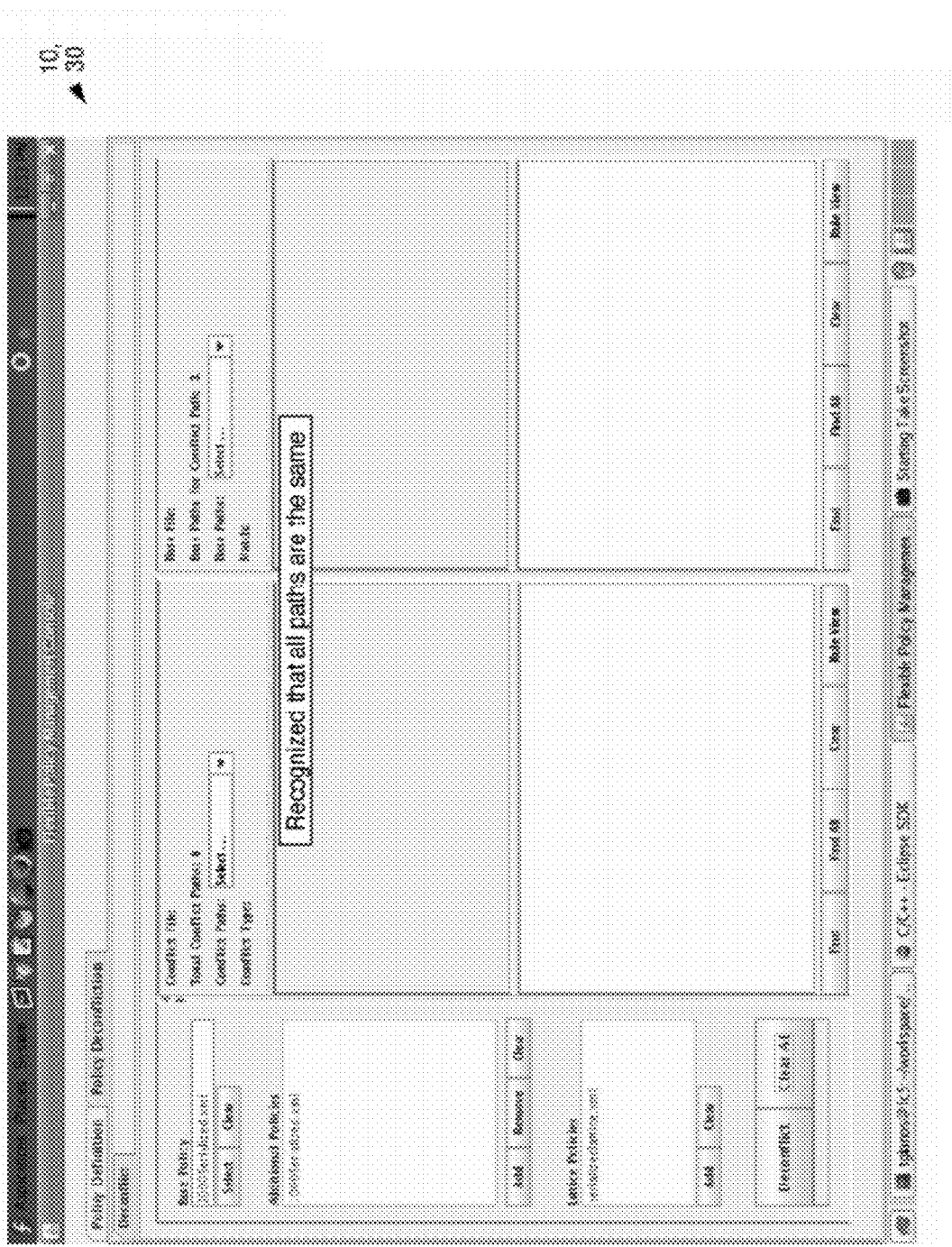
FIG. 5 illustrates an exemplary policy implementations scenario wherein, given a set of 1000 policy statements, a duplicate set of 1000 rules is generated and deconfliction is performed.
Figure 6:
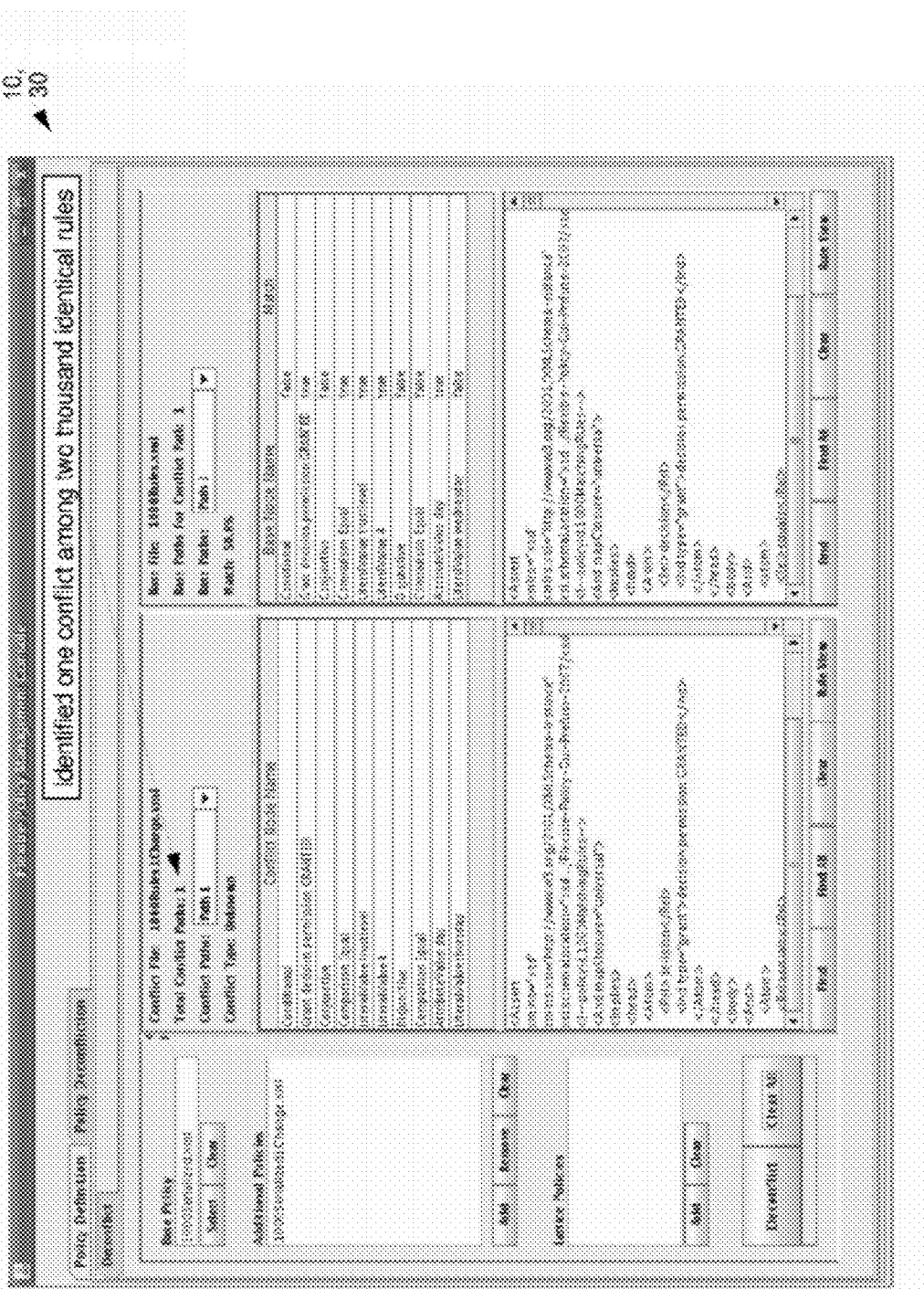
FIG. 6 illustrates an exemplary policy implementations scenario wherein, given a set of 1000 policy statements, a duplicate is generated and one or more statements are modified to introduce conflicts.

FIG. 5 illustrates an exemplary policy implementation scenario wherein, given a set of 1000 policy statements, a duplicate set of 1000 rules is generated and deconfliction is performed using the disclosed method 10 or software 30. As is shown in FIG. 6, one thousand (1000) rules were duplicated and sent through deconfliction using the disclosed method 10 or software 30. As expected, zero conflicts were found.

FIG. 6 illustrates an exemplary policy implementations scenario wherein, given a set of 1000 policy statements, a duplicate is generated and one or more statements are modified to introduce conflicts. The one conflicting path was found and marked as type unknown meaning not a matching path, but not a completely new path. The day attribute nodes were found to match between the conflict path and the base path but the Tuesday and Thursday nodes are conflicting.

Figure 7:
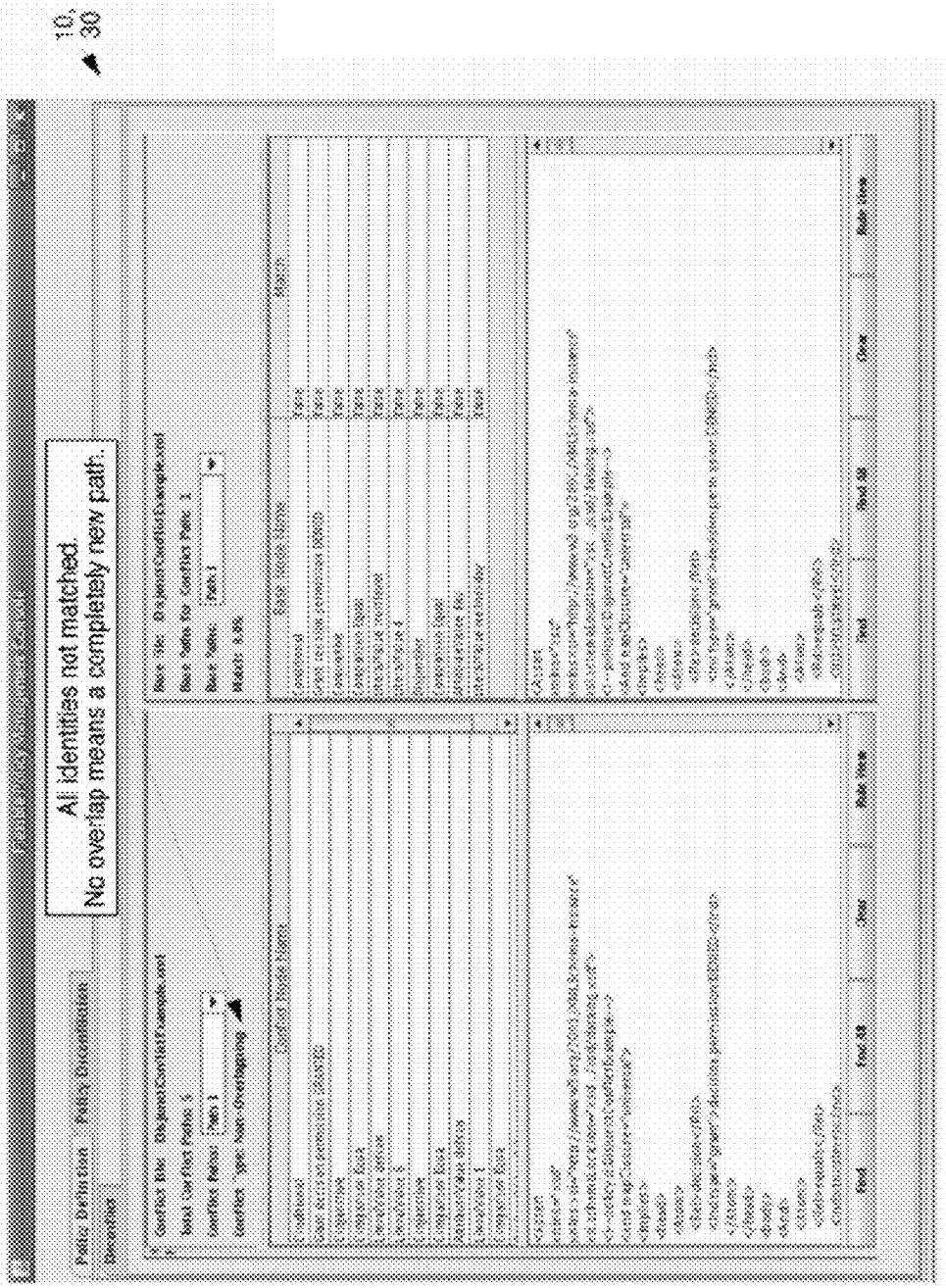
FIG. 7 illustrates an exemplary policy implementations scenario wherein, given a set of 1000 policy statements, a duplicate set of statements is generated with 5 new statements that reference no common attributes with the original set.

FIG. 7 illustrates an exemplary policy implementation scenario wherein, given a set of 1000 policy statements, a duplicate set of statements is generated with 5 new statements that reference no common attributes with the original set. In this implementation scenario, five (5) completely new paths were identified. One of whose nodes are highlighted in the frame to the right. Note the column of false matches and 0% match for the base path.

Figure 8:
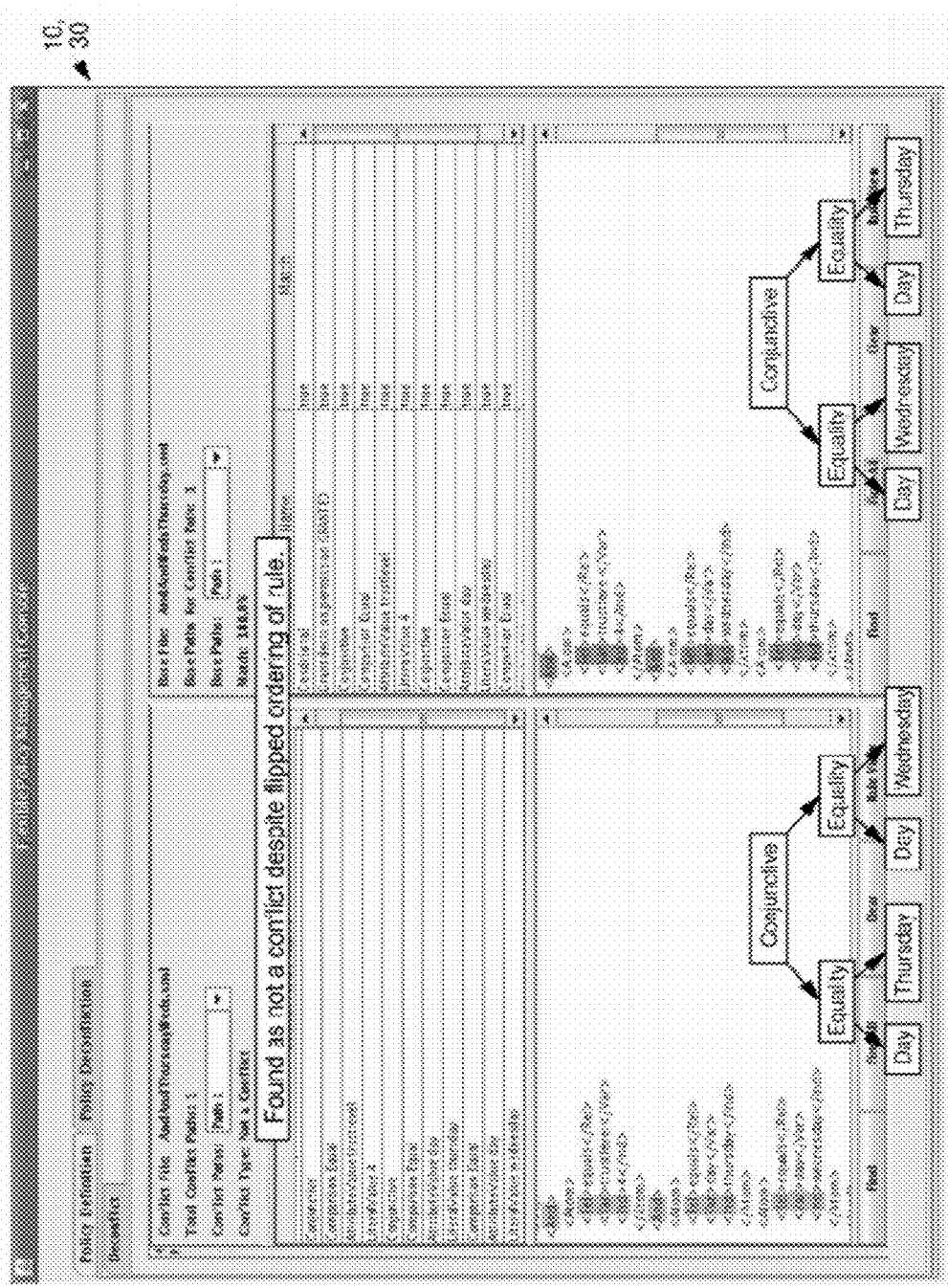
FIG. 8 illustrates an exemplary policy implementations scenario wherein, given a policy, a duplicate policy is generated but the order of occurrence of certain elements is switched.

FIG. 8 illustrates an exemplary policy implementation scenario wherein, given a policy, a duplicate policy is generated but the order of occurrence for certain elements is switched. The path with node positions switched was found to match perfectly with the base path and is labeled as "Not a Conflict."

The exemplary policy deconfliction methods 10 and software 30 involve compilation of specific policy languages to a semantic representation. In order to detect and correct conflicts, the exemplary policy deconfliction methods 10 and software 30 perform a path analysis over the semantic representation of the policy to distinguish between equivalent, new, and overlapping policy (potential conflicts), regardless of policy language.

The exemplary policy deconfliction methods 10 and software 30 provide a practical implementation with near-term deployment potential. In contrast, conventional policy products have significant limitations in relation to GIG needs (e.g. XACML implementations) or have been limited to research status (theorem provers).

Thus, exemplary policy deconfliction methods and software for insuring that a policy is executed as defined have been disclosed. It is to be understood that the above-described embodiments are merely illustrative of some of the many specific embodiments that represent applications of the principles disclosed herein. Clearly, numerous and other arrangements can be readily devised by those skilled in the art without departing from the scope of the invention.

What is claimed is:

1. A method for identifying policy conflicts between a base policy and a changed policy comprising:

generating, by executing software, a first graph that represents the base policy, the first graph including a plurality of base nodes and one or more base edges, each of the base nodes having a content and an identity, the content of each of the base nodes representing an attribute, a logic statement and/or a decision statement of the base policy, and the base edges representing one or more semantic relationships among the base nodes;

generating the identity of each base node by hashing the content of the base node and an identity of each child-base node of the base node;

generating a second graph that represents the changed policy, the second graph including a plurality of changed nodes and one or more changed edges, each of the changed nodes having a content and an identity, the content of each of the changed nodes representing an attribute, a logic statement and/or a decision statement of the changed policy, and the changed edges representing one or more semantic relationships among the changed nodes;

generating the identity of each changed node by hashing the content of the changed node and an identity of each child-changed node of the changed node;

comparing base decision paths against changed decision paths, each of the base decision paths extending from a base root-node to a base node whose content represents a base decision, each of the changed decision paths extending from a changed root-node to a changed node whose content represents a changed decision; and outputting a base decision path that does not have a corresponding changed decision path and a changed decision path that does not have a corresponding base decision path as potentially conflicting paths.

2. The method of claim 1 wherein the first graph and the second graph are acyclic graphs.

3. The method of claim 1 wherein the content of a base node comprises a base node type and a base node value, and the content of a changed node comprises a changed node type and a changed node value.

4. The method of claim 1 wherein the changed policy comprises an aggregate of many policies.

5. The method of claim 1 wherein the changed policy comprises individual policy updates.

6. The method of claim 1 further comprising:
classifying potential conflicts based on comparisons among the potential conflicting paths; and
analyzing the potentially conflicting paths with respect to predetermined patterns.

7. A software program stored in a computer system to identify policy conflicts between a base policy and a changed policy, the software program comprising:
a first code segment that generates a first graph that represents the base policy, the first graph including a plurality of base nodes and one or more base edges, each of the base nodes having a content and an identity, the content of each of the base nodes representing an attribute, a logic statement and/or a decision statement of the base policy, and the base edges representing one or more semantic relationships among the base nodes;
a second code segment that generates the identity of each base node by hashing the content of the base node and an identity of each child-base node of the base node;
a third code segment that generates a second graph that represents the changed policy, the second graph including a plurality of changed nodes and one or more changed edges, each of the changed nodes having a content and an identity, the content of each of the changed nodes representing an attribute, a logic statement and/or a decision statement of the changed policy, and the changed edges representing one or more semantic relationships among the changed nodes;
a fourth code segment that generates the identity of each changed node by hashing the content of the changed node and an identity of each child-changed node of the changed node;
a fifth code segment that compares base decision paths against changed decision paths, each of the base decision paths extending from a base root-node to a base node whose content represents a base decision, each of the changed decision paths extending from a changed root-node to a changed node whose content represents a changed decision; and
a sixth code segment that outputs a base decision path that does not have a corresponding changed decision path, and a changed decision path that does not have a corresponding base decision path as potentially conflicting paths.

8. The software program stored in the computer system of claim 7 wherein the first graph and the second graph are acyclic graphs.

9. The software program stored in the computer system of claim 7 wherein the content of a base node comprises a base node type and a base node value, and the content of a changed node comprises a changed node type and a changed node value.

10. The software program stored in the computer system of claim 7 wherein the changed policy comprises an aggregate of many policies.

11. The software program stored in the computer system of claim 7 wherein the changed policy comprises individual policy updates.

12. The software program stored in the computer system of claim 7, the software program further comprising:
a seventh code segment of the software program that configures the computer system to classify potential conflicts based on comparisons among the potentially conflicting paths; and
an eighth code segment of the software program that configures the computer system to analyze the potentially conflicting paths with respect to predetermined patterns.

13. A computer system that identifies policy conflicts between a base policy and a changed policy, comprising:
a first specialized computer system formed by configuring the computer system using a first segment of a software program, the first specialized computer system generating a first graph that represents the base policy, the first graph including a plurality of base nodes and one or more base edges, each of the base nodes having a content and an identity, the content of each of the base nodes representing an attribute, a logic statement and/or a decision statement of the base policy, and the base edges representing one or more semantic relationships among the base nodes;
a second specialized computer system formed by configuring the computer system using a second segment of the software program, the second computer system generating the identity of each base node by hashing the content of the base node and an identity of each child-base node of the base node;
a third specialized computer system formed by configuring the computer system using a third segment of the software program, the third specialized computer system generating a second graph that represents the changed policy, the second graph including a plurality of changed nodes and one or more changed edges, each of the changed nodes having a content and an identity, the content of each of the changed nodes representing an attribute, a logic statement and/or a decision statement of the changed policy, and the changed edges representing one or more semantic relationships among the changed nodes;
a fourth specialized computer system formed by configuring the computer system using a fourth segment of the software program, the fourth specialized computer system generating the identity of each changed node by hashing the content of the changed node and an identity of each child-changed node of the changed node;
a fifth specialized computer system formed by configuring the computer system using a fifth segment of the software program, the fifth specialized computer system comparing base decision paths against changed decision paths, each of the base decision paths extending from a base root-node to a base node whose content represents a base decision, each of the changed decision paths extending from a changed root-node to a changed node whose content represents a changed decision; and
a sixth specialized computer system formed by configuring the computer system using a sixth segment of the software program, the sixth specialized computer system outputting a base decision path that does not have a corresponding changed decision path, and a changed decision path that does not have a corresponding base decision path as potentially conflicting paths.

14. The computer system of claim 13 wherein the base graph and the changed graph are acyclic graphs.

15. The computer system of claim 13 wherein the content of a base node comprises a base node type and a base node value, and the content of a changed node comprises a changed node type and a changed node value.

16. The computer system of claim 15 wherein the changed policy comprises an aggregate of many policies.

17. The computer system of claim 13 wherein the changed policy comprises individual policy updates.

18. The computer system of claim 13 further comprising:
a seventh specialized computer system formed by configuring the computer system using a seventh segment of the software program, the seventh specialized computer system classifying potential conflicts based on comparisons among the potentially conflicting paths; and
an eighth specialized computer system formed by configuring the computer system using an eighth segment of the software program, the eighth specialized computer system analyzing the potentially conflicting paths with respect to predetermined patterns.

* * * * *